United States Patent [19]

Hashiguchi et al.

[11] Patent Number: 4,794,477

[45] Date of Patent: Dec. 27, 1988

[54] CASSETTE LOADING MECHANISM OF MAGNETIC RECORDING AND/OR REPRODUCING APPARATUS

[75] Inventors: Yasuhiro Hashiguchi, Katsuta; Noboru Katohno, Mito; Yoshihiro Shibata, Katsuta, all of Japan

[73] Assignee: Hitachi, Ltd., Tokyo, Japan

[21] Appl. No.: 36,374

[22] Filed: Apr. 9, 1987

[30] Foreign Application Priority Data

Apr. 9, 1986 [JP] Japan .................................. 61-80171

[51] Int. Cl.⁴ ............................................. G11B 15/60
[52] U.S. Cl. .................................... 360/96.5; 360/93; 242/198
[58] Field of Search ...................... 360/96.5, 96.6, 93, 360/85; 242/198–199

[56] References Cited

U.S. PATENT DOCUMENTS

| | | | |
|---|---|---|---|
| 3,936,011 | 2/1976 | Staar | 360/96.5 X |
| 4,257,075 | 3/1981 | Wysocki et al. | 360/96.5 |
| 4,583,138 | 4/1986 | Imazaike | 360/85 |

Primary Examiner—John H. Wolff
Attorney, Agent, or Firm—Antonelli, Terry & Wands

[57] ABSTRACT

A cassette loading mechanism of a magnetic recording and/or reproducing apparatus including: a cassette holder for accommodating a tape cassette; a bracket having a guide slit along which the cassette holder is guided from a first position to a second position, the bracket accommodating the cassette holder; a cassette holder driving mechanism for driving the cassette holder along the guide slit formed in the bracket, the cassette holder driving mechanism including cassette holder driving arm disposed between the cassette holder and the bracket and connected to the cassette holder; a power source; and a power transmitting means for driving the cassette holder driving arm while being supplied with power from the power source.

5 Claims, 8 Drawing Sheets

CASSETTE LOADING MECHANISM OF MAGNETIC RECORDING AND/OR REPRODUCING APPARATUS

BACKGROUND OF THE INVENTION

The present invention relates to a cassette loading mechanism for use in magnetic recording and/or reproducing apparatus such as a video tape recorder. Specifically, the present invention is suitably applied to a so-called front loading type cassette loading mechanism in which a cassette holder adapted to hold a tape cassette is moved vertically and horizontally by utilizing the driving force of a motor, that is, the cassette holder (tape cassette) is first moved in a horizontal direction and then moved in a vertical direction.

An example of this front loading type cassette loading mechanism (hereinafter referred to as "front loading mechanism") is constituted in the manner illustrated in FIGS. 1 to 4.

FIG. 1 shows a schematic plan view of a conventional front loading mechanism; FIG. 2 shows a side view of this eechanism seen from the left hand side; FIG. 3 shows an exploded perspective view of an essential part of this mechanism; and FIG. 4 shows a cross-sectional view of this essential part. As shown in these drawings, the front loading mechanism has a cassette holder 2 mounted between a left side bracket 3a and a right side bracket 3b. This cassette holder 2 is supported by means of shafts 11a, 11b, 12a and 12b, and rollers 14a, 14b, 15a and 15b such as to be movable along L-shaped guide slits $G_1$, $G_1$ and $G_3$, $G_3$ formed in the left and right side brackets 3a and 3b which are fixed to a main chassis 3 and acts as a member for positioning the entire part of the cassette loading mechanism. The shafts 11a, 11b, 12a and 12b are embedded in both side walls of the holder 2. Rollers 14a, 14b, 15a and 15b are fitted to the shafts 11a, 11b, 12a and 12b, and parts of these rollers are engaged with the guide slits $G_1$ and $G_2$ of the brackets 3a and 3b. Drive arm 22a and 22b and drive gears 21a and 21b are attached to a synchronizing shaft 25, and these arms have elongated holes H into which the rollers 14a and 14b are inserted. The drive gears 21a and 21b are adapted to be rotated by the driving force of a motor (not shown). The synchronizing shaft 25 is rotatably mounted on the left and right side brackets 3a and 3b.

The operation of this mechanism will be described below. When a cassette 1 is inserted into and positioned in the cassette holder 2, a detection switch (not shown) is switched on by the operation of the cassette holder 2, thereby driving the motor. The driving force of the motor is transmitted to, e.g., the gear 21a via a speed reduction mechanism constituted by, e.g., a worm gear. When the gear 21a is rotated anticlockwisely, the drive arm 22a is also rotated in the same direction while turning the gear 21b and the driving arm 22b, and the arm 22a applies a force to the cassette holder 2 in the leftward direction, so that the holder 2 is transported in the horizontal direction toward the inner part of the apparatus while carrying the cassette 1 and being guided along the guide slits $G_1$, $G_2$. After being moved a predetermined distance, the cassette holder 2 is guided along vertical portions of the guide slits $G_1$ and $G_2$ so as to be transported vertically and downwardly.

After the cassette 1 is loaded in a given position, a magnetic tape (not shown) incorporated in the cassette 1 is extracted by a tape loading mechanism (not shown) of the video tape recorder to be wound around a cylinder (not shown) having recording and reproducing heads, thereby effecting recording on the magnetic tape and reproduction of the same.

As described above, in the conventional cassette loading mechaiism, rotary members for driving the holder 2, namely, the drive arms 22a and 22b are positioned outside the brackets 3a and 3b so that the size of the mechanism is necessarily large, thus conflicting with the design requirements for reducing the size, height, and weight of the magnetic recording and/or reproducing apparatus.

SUMMARY OF THE INVENTION

It is therefore an objcct of the present invention to provide a cassette loading mechanism which is improved with a view to eliminating the above described problems of the conventional arts and which enables production of a magnetic recording and/or reproducing apparatus of reduced size.

To this end, the present invention provides a cassette loading mechanism of a magnetic recording and/or reproducing apparatus having: cassette holder for accommodating a tape cassette; a bracket having a guide slit along which the cassette holder is guided from a first position to a second position, the bracket accommodating the cassette holder; a cassette holder driving mechanism for driving the cassette holder along the guide slit formed in the bracket, the cassette holder driving mechanism including cassette holder driving means disposed between the cassette holder and the bracket and connected to the cassette holder; a power source; and power transmitting means for driving the cassette holder driving means while being supplied with power from the power source; wherein the cassette holder driving means is arranged between the cassette holder and the bracket in such a manner that the width of the cassette loading mechanism is reduced.

According to the present invention, rotary members are disposed in positions in which they do not interfere with a cassette lid opening and closing mechanism and a cassette insertion error prevention mechanism, thereby enabling reduction in the width of the cassette loading mechanism and in the size of the magnetic recording and/or reproducing apparatus.

BRIEF DESCRIPTION OF THE DRAWINGS

FIG. 8 is a side view of a cassette seen from the right hand side;

FIG. 9 is a side view of thecassette in the state wherein its lid is closed (when the aassette is inserted) seen from the right hand side;

FIG. 10 is a fragmentary plan view of a state related to that shown in FIG. 9;

FIG. 11 is a fragmentary plan view of a state in which a holder has moved in the horizontal direction from the state shown in FIG. 10 and a lid opening and closing switch arm has operated;

FIG. 12 is a side view of a state seen from the right hand side in which the holder has further moved in the horizontal direction from the state shown in FIG. 11 and the cassette lid has been lifted;

FIG. 14 is a schematic side view of a state of the cassette loading mechanism seen from the left hand side in which the cassette is not inserted;

FIG. 15 is a perspective view of an essential part of the mechanism with the cassette inserted thereinto; and FIG. 16 is a schematic side view of a state seen from the left hand side in which the cassette has been completely inserted and is able to be transported.

DETAILED DESCRIPTION OF THE PREFERRED EMBODIMENT

The present invention will be described below with respect to a preferred embodiment thereof.

Figure 1:
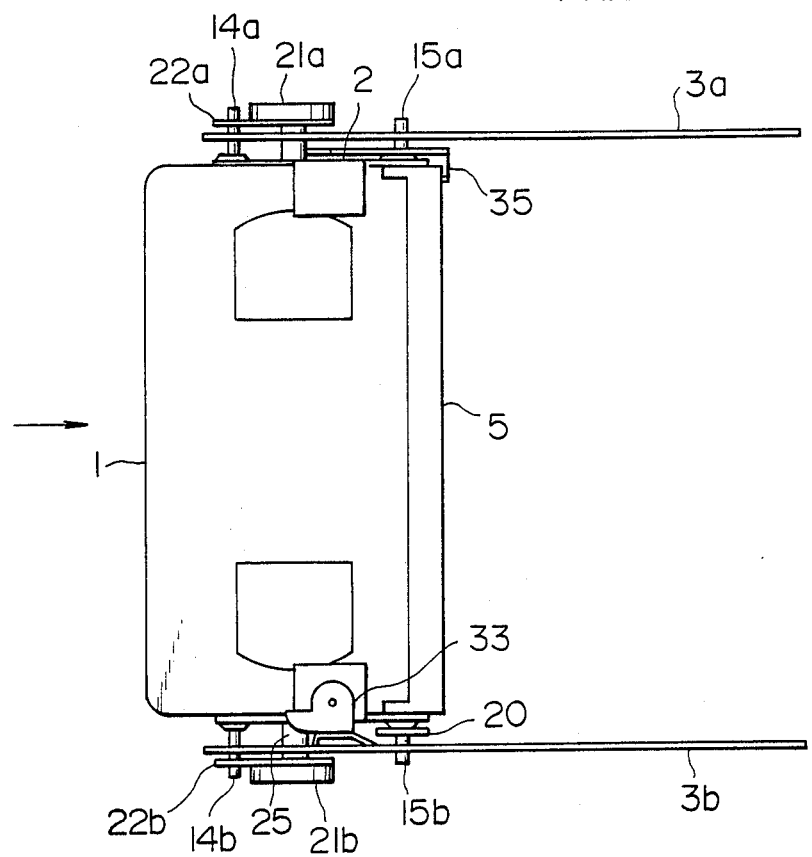
FIG. 1 is a plan view of a conventional cassette loading mechanism.
Figure 2:
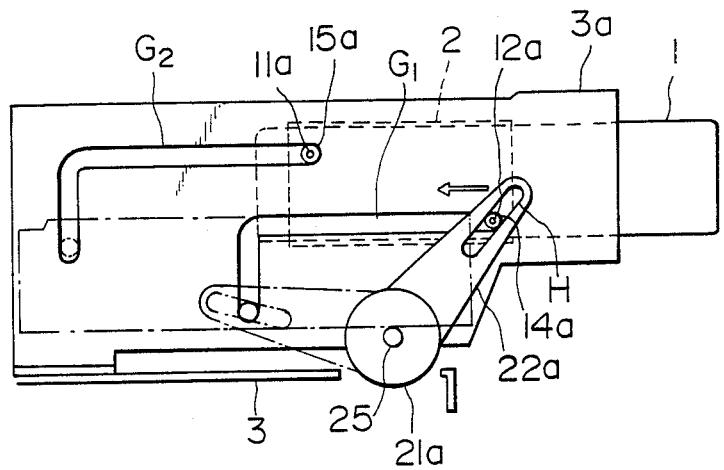
FIG. 2 is a side view of the mechanism shown in FIG. 1, seen from the left hand side.
Figure 3:
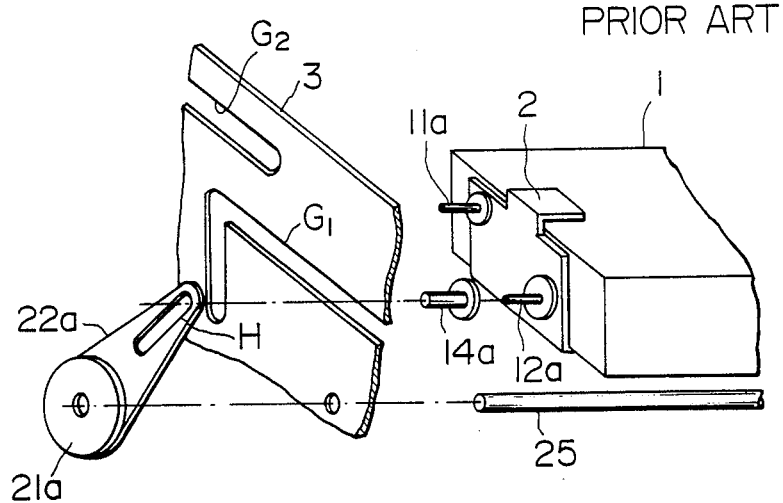
FIG. 3 is an exploded perspective view of an essential part of the mechanism shown in FIG. 1.
Figure 4:
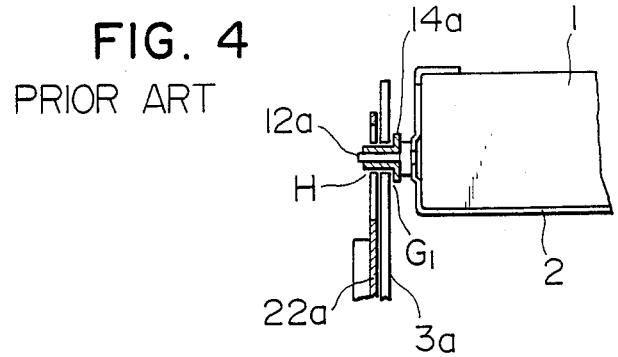
FIG. 4 is a cross-sectional view of the essential part shown in FIG. 3.
Figure 5:
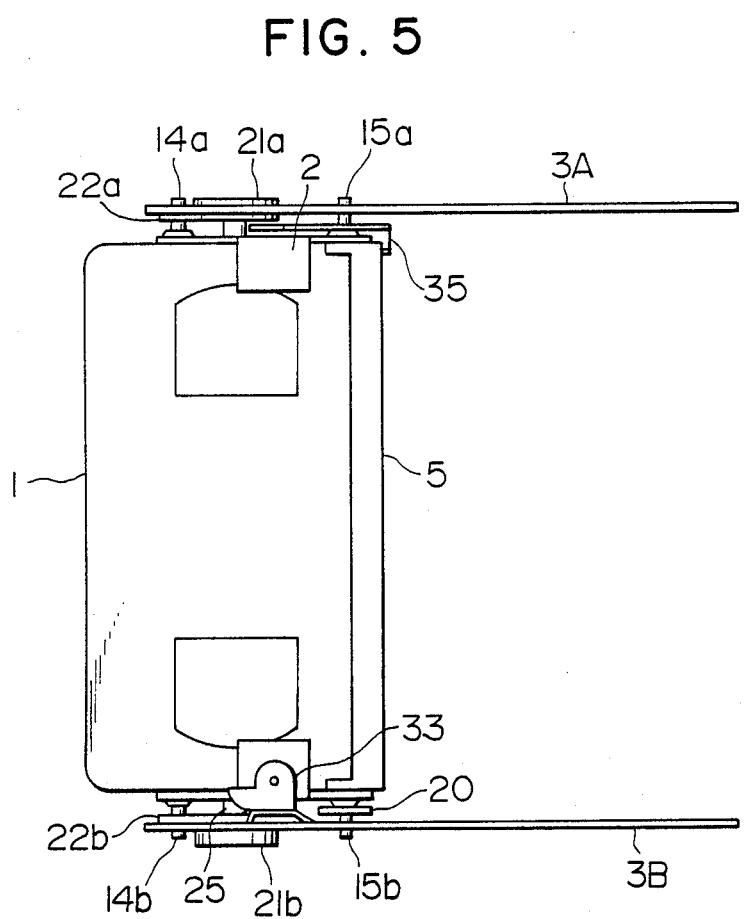
FIG. 5 is a plan view of a cassette loading mechanism which represents an embodiment of the present invention.
Figure 6:
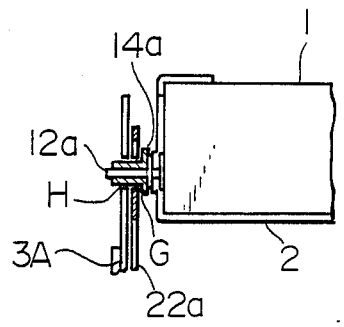
FIG. 6 is a cross-sectional view of an essential part of the cassette loading mechanism shown in FIG. 5.
Figure 7:
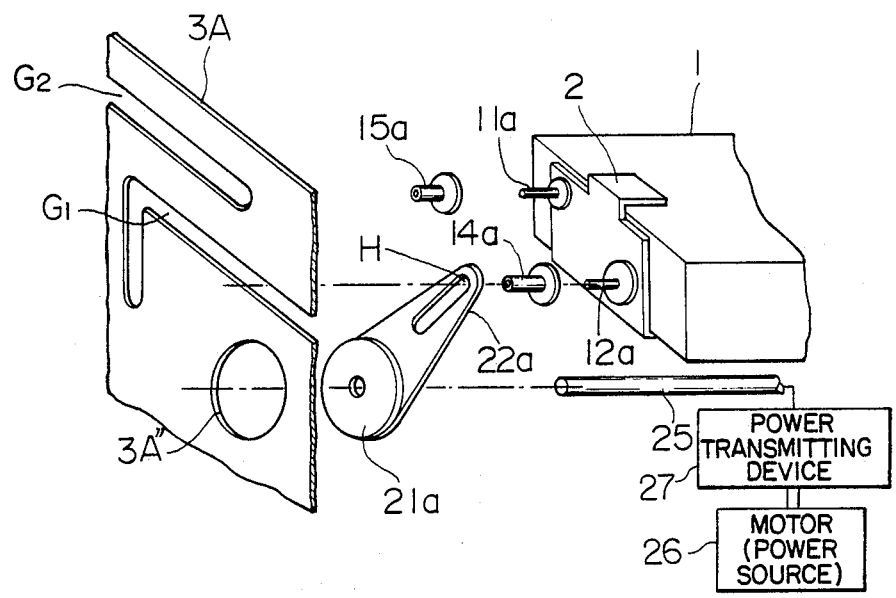
FIG. 7 is an exploded perspective view of the essential part shown in FIG. 6.
Figure 8:
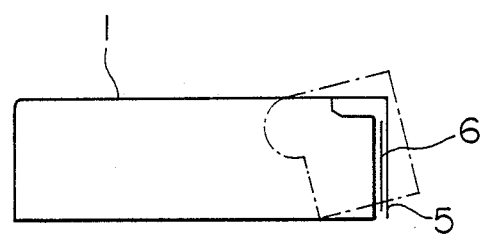
FIGS. 8 to 12 illustrate a cassette lid opening and closing mechanism in the cassette loading mechanism shown in FIG. 5.
Figure 9:
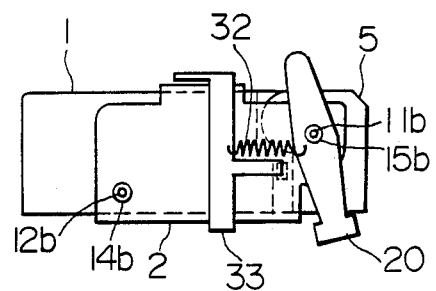
Figure 10:
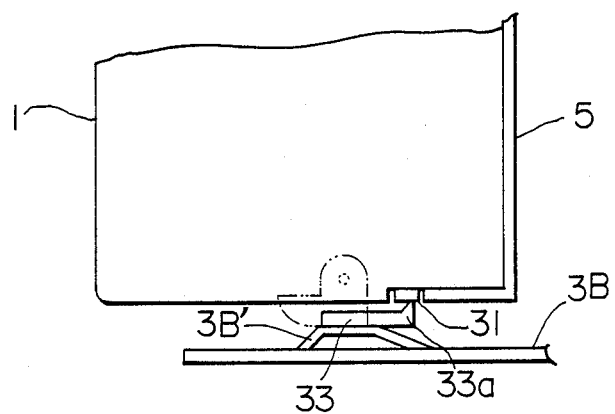
Figure 11:
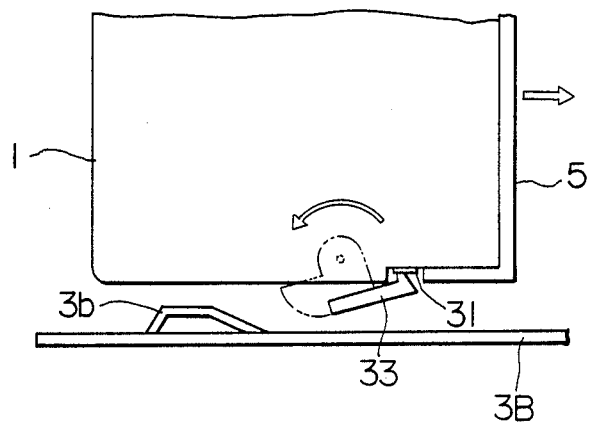
Figure 12:
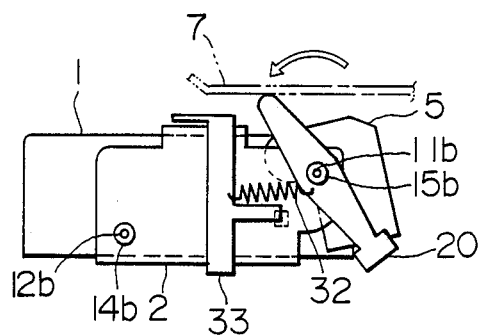
Figure 13:
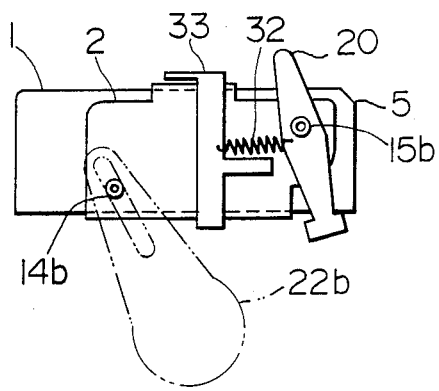
FIG. 13 is a side view of the cassette loading mechanism shown in FIG. 5, seen from the right hand side.
Figure 14:
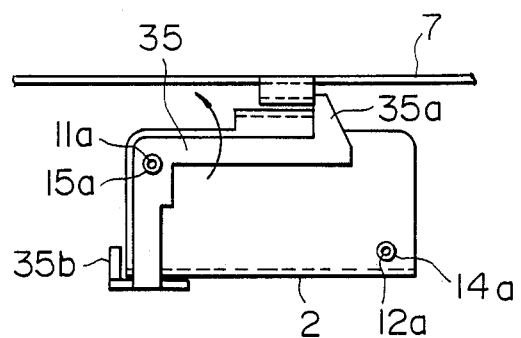
FIGS. 14 to 16 are illustaations of a cassette insertion error prevention mechanism of the cassette loading mechanism shown in FIG. 5.
Figure 15:
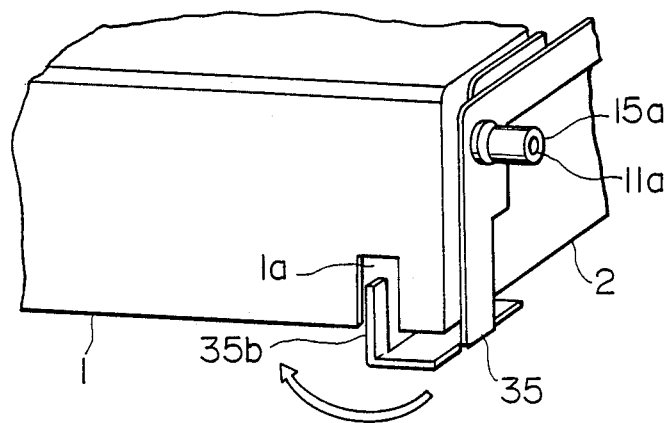
Figure 16:
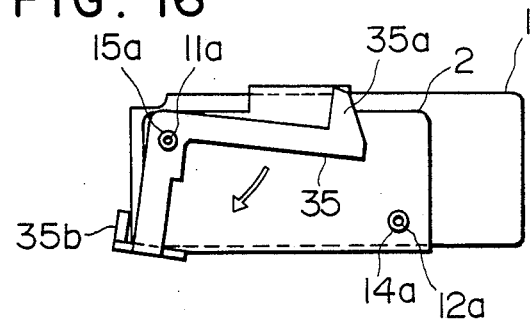

FIG. 5 shows a scheaatic plan view of a cassette loading mechanism which represents an emodiment of the present invention; FIG. 6 shows a detailed fragmentary cross-sectional view of a left hand portion of this cassette loading mechanism; and FIG. 7 is an exploded perspective view of the portion shown in FIG. 6. FIGS. 8 to 12 illustrate a cassette lid opening and closing mechanism of the cassette loading mechanism shown in FIG. 5; FIG. 8 shows a schematic side view of a cassette seen from the right hand side; FIG. 9 shows the side view of the cassette in the state wherein its lid is closed (when the cassette is being inserted) seen from the right hand side; FIG. 10 shows a fragmentary plan view of a state related to that shown in FIG. 9; FIG. 11 shows a fragmentary plan view of a state in which a holder has moved in the horizontal direction from the state shown in FIG. 10 and a lid opening and closing switch arm has been operated; and FIG. 12 shows the side view of a state seen from the right hand side in which the holder has moved further in the horizottal direction from the state shown in FIG. 11 and in which the cassette lid has been lifted. FIG. 13 shows a schematic side view of the cassette loading mechanism shown in FIG. 5, seen from the right hand side. FIGS. 14 to 16 are illustrations of a cassette insertion error prevention mechanism of the cassette loading mechanism shown in FIG. 5; FIG. 14 shows a schematic side view of a state of the cassette loading mechanism seen from the left hand side in which the cassette has not yet been inserted, FIG. 15 shows a perspective view of an essential part of the mechanism with the cassette inserted thereinto; and FIG. 16 shows a schematic side view of a state seen from the left hand side in which the cassette has been completely inserted and is able to be transported. In these drawings, the same reference numerals as those used in FIGS. 1 to 4 indicate identical portions.

The general construction of this cassette loading mechanism is as follows. Rollers 14a, 15b and rollers 14b and 15b, the former being mounted on the left side wall of a cassette holder 2 in the form of a cassette holding member, and the latter on the right side wall of the same, and all of which act as support members for supporting the holder, are engaged wihh guide slits G (described later in detail) formed in a pair of left and right brackets 3A and 3B which are fixed to the main chassis 3 of a magnetic recording and/or reproducing apparatus. These rollers are driven along the guide slits G by a left drive arm 22a and a right drive arm 22b provided as rotary members. A tape cassette 1, which has been inserted though a cassette insertion opening formed in the main body of the magnetic recording and/or reproducing apparatus so as to be mounted in the holder 2, is thereby transported to a predetermined position in the main body. The drive arm 22a is disposed between the holder 2 and the bracket 3A, and the drive arm 22b is disposed between the holder 2 and the bracket 3B.

The detail of the left hand portion of this cassette loading mechanism will be described with reference to FIGS. 6 and 7. The right hand portion has the same construction with respect to the drive arms and other portions, and the description of the same is therefore omitted.

As shown in FIG. 6, a cassette holder driving means including the drive arm 22a is disposed between the cassette 1, the holder 2 and the bracket 3A. The relationship between the positions of the drive arm 22a and the brackets is reverse to that rn the conventional cassette loading mechanism. As shown in FIG. 7, the roller 14a which is rotatably mounted on a shaft 12a embedded in the holder 2 passes through an elongated hole H formed in the drive arm 22a and is engaged with an L-shaped guide slit $G_1$ formed in the bracket 3A. The roller 15a which is rotatably mounted on a shaft 11a is engaged with an L-shaped guide slit $G_2$ formed in the 5 bracket 3A. A gear 21a which is mounted on a shaft 25 is inserted into a hole 3A" formed in the bracket 3A, as shown in FIG. 5, and is connected to the above-described motor (power source) 26 by way of a power transmitting device 27. A cassette insertion error prevention mechanism (described later) is disposed between the holder 2 and the bracket 3A, and a cassette lid opening and closing mechanism (described later) is disposed between the holder 2 and the brackets 3B. Therefore, the distance between the brackets 3A and 3B and the opposite side walls of the holder 2 is the same as that in the conventional cassette loading mechanism and cannot be reduced. However, it is possible to reduce the total width of the cassette loading mechanism of the present invention by disposing the drive arms 22a and 22b inside the brackets 3A and 3B. It goes without saying that the drive arms 22a and 22b do not interfere with the cassette insertion error prevention mechanism and the cassette lid opening and closing mechanism.

The operation of the thus constructed cassette loading mechanism in accordance with the present invention is similar to that of the conventional mechanism. The rollers 14a and 15a of the holder 2 are driven by the drive arm 22a along the guide slit $G_1$, and the rollers 14b and 15b are driven in synchronism therewith by the drive arm 22b along the guide slit of the bracket 3B, thereby transferring the cassette 1 inserted into the holder 2 through the insertion opening to its predetermined position in the main body. The drive arms 22a and 22b are rotated when driven by the motor or the like.

Next, the cassette lid opening and closing mechanism will be described with reference to FIGS. 8 to 12.

The cassette 1 is provided, as is well known, with a lid 5 adapted for protecting a tape 6 incorporated in the cassette 1, and is also provided with a switch member 31 (refer to FIG. 10) for releasing a lock of the lid 5. The lid 5 is opened when the magnetic recording and/or reproducing apparatus effects recording or reproducing. In the cassette loading mechanism constructed in accordance with the present invention, when the cassette 1 is moved in the horizontal direction after insertion, the lid 5 is preliminarily opened by several millimeters before being fully opened. As is well known, the tape 6 is extracted by guide rollers to be wound around a cylinder after the cassette 1 has been placed in its predetermined position. The tape 6 is driven while being pinched between a capstan and a pinch roller. It is therefore necessary for the cassette 1 to be carried so that the tape 6 may pass over the guide rollers and the capstan before the cassette 1 is transported to the predetermined position. Since, as shown in FIG. 8, the position of the lid 5 is lower than that of the tape 6 accommodated in the cassette 1, the lid 5 may be designed to be slightly opened during the horizontal movement of the cassette 1 so as to be adjusted to the level of the lower end of the tape 6, thereby enabling the cassette loading mechanism to be reduced in height while ensuring that the tape 6 may pass over the guide rollers, the capstan and other members.

This operation is conducted as described below. To preliminarily open the lid 5, the switch member 31 of the cassette 1 is first pressed so as to release the lock, and this pressing operation is effected by using a switch arm 33 which is adapted for opening and closing the lid 5. As shown in FIGS. 12 and 13, this arm 33 is supported by rotary support shafts disposed on the upper and lower sides of the holder 2 such as to be rotatable around these rotary support shafts. FIG. 10 illustrates the initial state of the operation of transferring the cassette 1, that is, the state in which the cassette 1 has been inserted or an unloading operation has been completed. A slide portion in the form of the profile of a boat formed in the upper part of the switch arm 33 rides on a cut and raised portion (projection) 3B' formed on the bracket 3B, and a contact portion 33a which is formed at the center of the switch arm 33 such as to be capable of contacting the switch member 31 is not yet in contact with the same. This is because, if the switch member 31 is constantly in contact with the switch arm 33, the operator will be given the feeling that the cassette 1 is caught when inserting or removing the cassette 1. The switch arm 33 is set apart in order to eliminate this feeling during the operation of inserting or removing the cassette 1. As the cassette 1 is transported in the horizontal direction, the switch arm 33 is parted from the raised portion of the bracket 3B and a turning force acting in the anticlockwise direction indicated by the arrow in FIG. 11 imparted thereto, as a result of which the switch member 31 is pressed to enable the lid 5 to be opened or closed. A spring 32 is stretched between an opening and closing arm 220 (described below) and the switch arm 33, thereby applying an urging force to the opening and closing arm 20 in the clockwise direction as viewed in FIG. 12 and applying an urging force to the switch arm 33 in the anticlockwise direction as viewed in FIG. 11. As shown in FIGS. 12 and 13, the opening and closing arm 20 is rotatably attached to the shaft 11b and is maintained in a position in which the lower end thereof is generally in contact with the lid 5 of the cassette 1. As the holder 2 is moved further from the state shown in FIG. 11, the upper end of the opening and closing arm 20 contacts a ceiling plate of the cassette loading mechanism and turns by virtue of the turning force imparted to it in the anticlockwise direction as indicated by the arrow in FIG. 12, so that the lid 5 which has been in contact with the lower end of the opening and closing arm 20 is opened by several millimeters, as shown in FIG. 12.

The relationship between the positions of the cassette lid opening and closing mechanism and the drive arm 22b is as illustrated in FIG. 13. The opening and closing arm 20 and the switch arm 33 are placed in positions that are comparatively remote from the insertion opening (not shown). In contrast, the roller 14b is placed near the insertion opening, so that the drive arm 22b does not interfere with the switch arm 33.

Lastly, the cassette insertion error prevention mechanism will be described with reference to FIGS. 14 to 16. As shown in FIG. 14, a hook arm 35 is rotatably attached to the shaft 11a and is constantly urged in the anticlockwise direction by a spring (not shown). A hook portion 35a formed at the upper end of the hook arm 35 is engaged with the ceiling plate 7, so that, if an object other than the cassette 1 is inserted or if the cassette 1 is inserted upside down, the hook portion 35a acts as a stopper to stop the cassette 1 from being transported. As shown in FIG. 15, the lid 5 of the cassette 1 is provided with a slit 1a for detecting the completed state of the operation of inserting the cassette 1. As the cassette 1 is inserted, the hook arm 35 is brought into contact with the cassette 1 in this slit and is turned about the shaft 11a. In accordance with this operation, the hook portion of the hook arm 35 is moved downwardly, as shown in FIG. 16, and the engagement with the ceiling plate 7 is thereby released, thereby enabling the cassette to be transported.

What is claimed is:

1. A cassette loading mechanism of a magnetic recording and/or reproducing apparatus comprising:
   a cassette holder for accommodating a tape cassette, said cassette holder including guide members;
   a bracket disposed outside of said cassette holder and having guide slits along which said guide members of said cassette holder are guided, said cassette holder being guided by said guide slits and said guide members from a first position to a second position;
   a cassette holder driving mechanism for driving said cassette holder wherein said cassette holder driving mechanism includes a driving arm which engages one of said guide members of said cassette holder driving said cassette holder along said guide slits said driving arm being disposed in a space provided between said cassette holder and said bracket;
   a power source for providing motive power; and
   power transmitting means for rotating said driving arm while being supplied with motive power from said power source; wherein
   said space between said cassette holder and said bracket also accommodates other mechanisms of said cassette loading mechanism other than said driving arm such that a width of said cassette loading mechanism taken across said cassette loadmechanism perpendicular to said bracket is reduced compared to the width of conventional cassette loading mechanisms.

2. A cassette loading mechanism according to claim 1, wherein said driving arm has an elongated hole for receiving one of said guide members.

3. A cassette loading mechanism according to claim 1, wherein each of said guide member includes a shaft fixed to said cassette holder, and a roller fitted to said shaft.

4. A cassette loading mechanism according to claim 1, further comprising:

a cassette lid opening and closing mechanism disposed between said cassette holder and said bracket for opening a cassette lid of a cassette wherein said cassette includes a switch member disposed in a side wall of said cassette for opening and closing said cassette lid, said cassette lid opening and closing mechanism includes a switch arm rotatably and axially supported on said cassette holder for actuating said switch member so as to enable said cassette lid to be opened or closed; a lid opening and closing arm for opening and closing said cassette lid; a spring stretched between said arms for urging said arms in opposite directions; a projection formed on said bracket for causing said switch arm to turn from a first position to a position adjacent said switch member when said cassette is inserted into said cassette holder, said switch arm turning back to said first position actuating said switch member when said cassette holder is transported in a horizontal direction to a predetermined position past said projection; and a ceiling plate contacting and turning said lid opening and closing arm so as to upwardly open said cassette lid of said cassette to a predetermined position when said cassette holder is further moved in the horizontal direction.

5. A cassette loading mechanism according to claim 1, further comprising:

a cassette insertion error prevention mechanism for preventing erroneous insertion of a cassette, said cassette insertion error prevention mechanism being disposed between said cassette holder and said bracket, said cassette error insertion prevention mechanism includes a stopper attached to a ceiling plate; a hook arm rotatably attached to said bracket, a first end of said hook arm having a slit finder facing a rear surface of a cassette, and a second end of said hook arm having a hook which releasably engages said stopper; such that when a cassette having a slit on its rear surface is inserted in said cassette loading mechanism said slit finder fits within said slit causing said hook arm to rotate, disengaging said hook from said stopper.

* * * * *